United States Patent [19]

Goto et al.

[11] 4,217,133
[45] Aug. 12, 1980

[54] REFINING ADDITIVE AND PROCESS FOR PREPARING SAME

[75] Inventors: Takeshi Goto, Atsugi; Noboru Kawakami, Tokyo; Itsuo Hirano, Sagamihara; Yuji Kawahara, Chigasaki, all of Japan

[73] Assignee: Toyo Soda Manufacturing Co., Ltd., Shinnanyo, Japan

[21] Appl. No.: 22,837

[22] Filed: Mar. 22, 1979

[30] Foreign Application Priority Data

Mar. 24, 1978 [JP] Japan ................... 53-33042

[51] Int. Cl.² .................................... C21C 7/00
[52] U.S. Cl. ........................... 75/58; 75/53; 75/130 R
[58] Field of Search ............... 75/53, 58, 130 R, 24

[56] References Cited

U.S. PATENT DOCUMENTS

| 443,898 | 12/1890 | Colquhoun | 75/24 |
| 2,798,048 | 7/1957 | Magri | 75/24 |
| 3,964,899 | 6/1976 | Jones | 75/58 |
| 4,067,729 | 1/1978 | Holzgruber | 75/58 |
| 4,137,072 | 1/1979 | Kawakomi | 75/58 |

*Primary Examiner*—P. D. Rosenberg
*Attorney, Agent, or Firm*—Cushman, Darby & Cushman

[57] ABSTRACT

An additive for use in metal-refining, particularly desulfurization of pig iron, inoculation for spheroidal graphite cast-iron and dephosphorization of various metals, is prepared by a process wherein a composition comprised of (a) magnesium carbonate and/or magnesium oxide and (b) calcium carbonate and/or calcium oxide is maintained at a temperature of from 1,600° to 4,000° C. in the presence of a carbonaceous material in a non-oxidizing atmosphere, and then, the reaction product in the form of dust is suddenly cooled.

7 Claims, 3 Drawing Figures

REFINING ADDITIVE AND PROCESS FOR PREPARING SAME

BACKGROUND OF THE INVENTION

1. Field of the Invention

This invention relates to an additive for use in metal refining and a process for preparing the same. The additive comprises metallic magnesium and calcium carbide, and is useful particularly as a desulfurizer for a molten pig iron, as an inoculant for spheroidal graphite cast-iron and as a dephosphorizer for various molten metals.

2. Description of the Prior Art

Both calcium carbide and metallic magnesium have heretofore been widely used as a metal-refining aadditive, such as a desulfurizer and a dephosphorizer. Calcium carbide possesses some defects, which are such that, when it is used in the desulfurization of a molten pig iron or the preparation of spheroidal graphite cast-iron, calcium carbide exhibits a low conversion and inevitably produces a slag containing a salient amount of calcium carbide. Metallic magnesium also possesses some defects, which are such that, metallic magnesium causes a radical reaction because of its relatively high vapor pressure and, hence, the operation is dangerous and the reaction efficiency is low.

SUMMARY OF THE INVENTION

The main object of the present invention is to provide an additive for use in metal-refining, which additive does not have the above-mentioned defects and exhibits and improved reaction efficiency.

Other objects and advantages of the present invention will be apparent from the following description.

In one aspect of the present invention there is provided a process for preparing an additive for use in metal-refining, which comprises the steps of:

maintaining a composition comprised of at least one magnesium compound selected from the group consisting of magnesium carbonate and magnesum oxide, and at least one calcium compound selected from the group consisting of calcium carbonate and calcium oxide, at a temperature of from 1,600° to 4,000° C., in the presence of a carbonaceous material, in a non-oxidizing gas atmosphere, and then, suddenly cooling the reaction product so obtained.

In another aspect of the present invention there is provided an additive for use in metal-refining, which is prepared by the above-mentioned process.

BRIEF DESCRIPTION OF THE DRAWINGS

The features of the present invention will be better understood from the following detailed description taken in conjunction with the accompanying drawings, in which.

DESCRIPTION OF THE PREFERRED EMBODIMENTS

Figure 1:
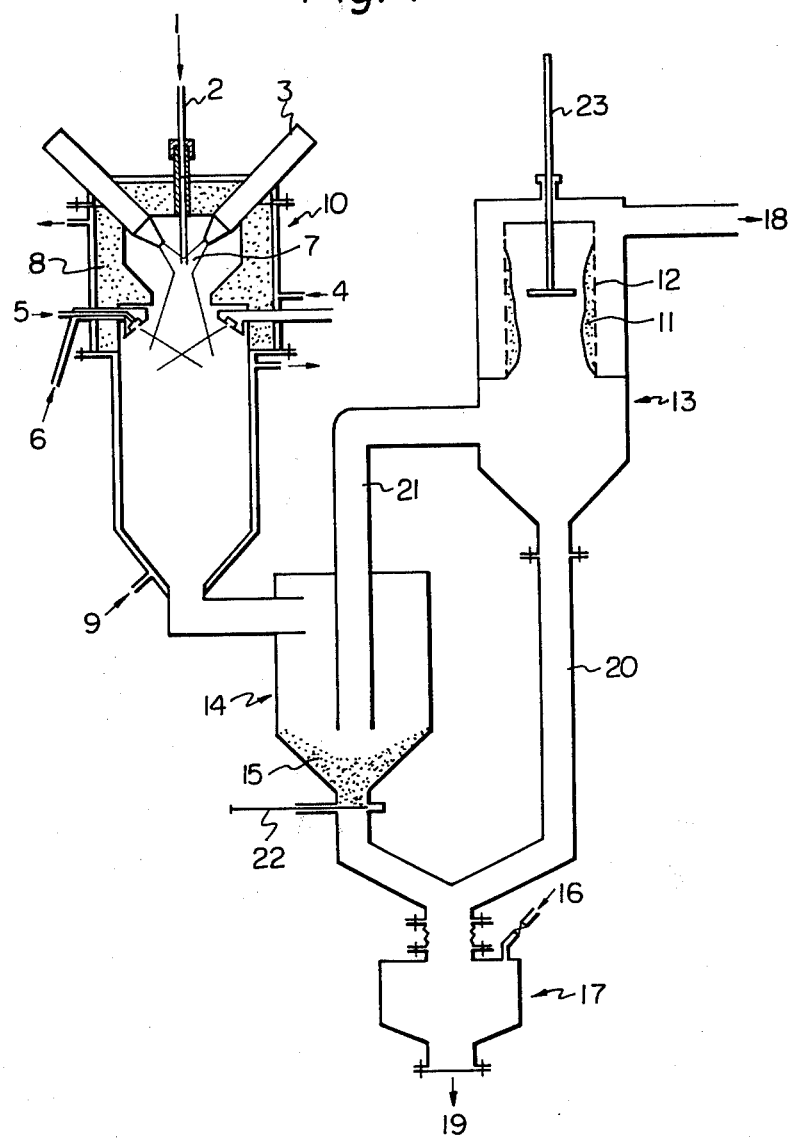
FIG. 1 is a schematic diagram of an apparatus used for the practice of the process of the present invention.

Referring to FIG. 1, which illustrates one preferred apparatus used for carrying out the process of the present invention, a finely divided solid feed 1, comprised of (a) a magnesium carbonate and/or magnesium oxide, (b) calcium carbonate and/or calcium oxide, and (c) a carbonaceous material, is introduced through a feed tube 2 into a reactor furnace 10. The reactor furnace 10 is provided with a three-phase direct current arc plasma generator 3. The arc plasma generator is so arranged that large plasma flames are formed in a reaction chamber having an artificial graphite inner lining 8. The reactor furnace 10 is cooled by a cooling liquid medium 4, 6 and 9. The solid feed is exposed to a temperature of from 1,600° to 4,000° C. within the plasma flames 7, thereby to undergo reaction, and then, the reaction product in the form of dust is suddenly cooled by a cooling gas 5. The cooled dust 15 is collected in a cyclone 14. Gaseous ingredients, i.e., gases produced by the reaction and the introduced cooling gas, are flowed through a tube 21 into a bag filter 13, from which the gaseous ingredients are withdrawn as exhaust gas 18. A portion of the dust 11 floating in the gaseous ingredients is collected on a filter 12. This dust 11 is scraped off by means of a bar 23, and flowed through a tube 20 into a kneader 17. The dust 15 is also flowed through a valve 22 into the kneader 17. The dust 15 and the dust 11 are kneaded together with a polymer binder solution 16 in the kneader 17, and thereafter, the resultant kneaded product 19 is withdrawn from the kneader 17.

The invention will now be described in more detail.

The raw material used in the process of the invention is a composition comprised of (a) magnesium carbonate and/or magnesium oxide, and (b) calcium carbonate and/or calcium oxide. This composition may be either a mixture of the magnesium compound and the calcium compound, or a compound, i.e. carbonate or oxide, containing both magnesium and calcium. The composition may be a combination of such a mixture and such a compound. The compound containing both magnesium and calcium includes, for example, natural dolomite, which is usually used in a calcined form, and synthetic dolomite. The proportion of the magnesium carbonate and/or oxide ingredient to the calcium carbonate and/or oxide ingredient in the composition is not particularly critical, and may be suitably varied depending upon the particular use of the additive prepared. Generally the composition comprises 10 to 97% by weight, more preferably 15 to 95% by weight, of the magnesium carbonate and/or oxide ingredient, and 3 to 90% by weight, more preferably 5 to 85% by weight, of the calcium carbonate and/or oxide ingredient, based on the weight of the composition.

The carbonaceous material used includes, for example, petroleum coke, graphite and carbon black. The composition comprised of the magnesium carbonate and/or oxide ingredient and the calcium carbonate and/or oxide ingredient is heated in the presence of the carbonaceous material in a non-oxidizing gas atmosphere, whereby the respective ingredients in the composition are reduced. The temperature at which the composition is maintained should be sufficiently high so that the intended reducing reaction is completed within a reasonable period of time. The temperature is usually in the range of from 1,600° C. to 4,000° C., more preferably from 1,750° to 4,000° C. The period of which the composition is exposed to such temperature may be varied, usually within the range of from 1/100 seconds to 6 minutes. The non-oxidizing gas used includes, for example, nitrogen, argon, helium, hydrogen or natural gas.

The type of reaction furnace used for carrying out the process of the invention is not particularly limited. Usually, a plasma furnace and a crucible furnace are preferably used when relatively high and relatively low reaction temperatures are desired, respectively.

The reducing reaction involved in the process of the invention is represented by the following formula (1).

$$MgO + CaO + 2C \rightarrow Mg + Ca + 2CO \qquad (1)$$

The rate of reaction in the formula (1) is determined depending upon the reduction of CaO. Actually, the reduction of CaO, represented by the following formula (2), predominantly takes place.

$$CaO + 3C \rightarrow CaC_2 + CO \qquad (2)$$

Concurrently therewith magnesium is produced in accordance with the folloiwng formula (3).

$$MgO + C \rightarrow Mg + CO \qquad (3)$$

In addition to the reduction of CaO represented by the formulae (2) and (3), it is presumed that the reactions represented by the following formulae (4) and (5) also take place.

$$MgO + CaC_2 \rightarrow Mg + CaO + 2C \qquad (4)$$

$$\tfrac{1}{2}CaC_2 + CaO \rightarrow 3/2 Ca + CO \qquad (5)$$

It is also possible that the reverse reactions represented by the following formulae (6) and (7) takes place.

$$Mg + CO \rightarrow MgO + C \qquad (6)$$

$$3/2 Ca + CO \rightarrow \tfrac{1}{2}CaC_2 + CaO \qquad (7)$$

The reaction product produced by the reducing reaction should be cooled suddenly, i.e., as rapidly as possible, to a temperature at which the above-mentioned reverse reactions of the formulae (6) and (7) do not proceed. It is preferable that the reaction product be cooled to a temperature of lower than approximately 500° C. within a period of from 1/100 to 1/5000 second. The sudden cooling of the reaction product may be conveniently carried out by spraying the reaction product in a finely divided form into a salient amount of a cooling gas, such as nitrogen, argon, helium, hydrogen or methane or a mixture thereof. Although the procedure by which the sudden cooling of the reaction product is carried out is not specifically limited, it is preferable that the sudden cooling of the reaction product is effected by blowing thereagainst a salient amount of a cooling gas. The amount of a cooling gas blown against the reaction product may usually be varied within the range of from 10 to 60 times the volume of the reaction product.

The reaction product, so solidified by the sudden cooling, is separated from the cooling gas and then, collected. The collected product is in the form of ultrafine particles having an average particle size of from 0.1 to 2 microns. This product is comprised of relatively predominant amounts of the reduced products, i.e., metallic magnesium and calcium carbide, and relatively inferior amounts of the products produced by the reverse reactions hereinbefore mentioned, i.e., magnesium oxide, calcium oxide and carbon. Although the composition of the reaction product may be varied depending upon the composition of the raw material used and the rate of cooling the reaction product, the reaction product is usually comprised of 5 to 55% by weight of magnesium, 3 to 40% by weight of magnesium oxide 1 to 50% by weight of calcium carbide, 3 to 70% by weight of calcium oxide, and the balance of calcium and carbon, based on the weight of the reaction product.

The reaction product may be used as an additive for metal-refining as it is in a finely divided particle form. It is, however, preferable that the reaction product be molded into a suitable shape and size. The manner in which the reaction product is molded is not critical, and the reaction product may be molded by using a conventional molding apparatus and in an inert gas atmosphere, such as nitrogen and argon. The molded product may be of a shape such as granules, pellets, spheres and the like.

The molding of the finely divided reaction product may be carried out by using an organic polymer binding material. The organic polymer binding material used includes, for example, acrylate polymer resins, styrene polymer resins, polyolefins, epoxy resins, polyvinyl alcohol and carboxymethyl cellulose. The organic polymer binding material may be either solid or liquid. When the polymer binding material is liquid, it may be used as it is. It is preferable, however, that the polymer binding material be used in a solution form dissolved in an conventional organic solvent such as benzene, toluene, xylene, ethyl acetate and methyl ethyl ketone. THe concentration of the organic polymer binding material in the solution used may conveniently be varied within the range of from 0.5% to 25% by weight, preferably 2% to 10% by weight, based on the weight of the finely divided reaction product. The amount of the solution may usually be varied within the range of from 5% to 100% by weight based on the weight of the finely divided reaction product.

Instead of using the organic polymer binding material, the molded product may be heat-treated at a temperature approximately equal to or higher than the melting point of magnesium (i.e., approximately 650° C.) to at least partially melt magnesium, thereby making the molding product rigid and convenient to handle. It is preferable that the heat treatment be carried out in an inert gas atmosphere, such as nitrogen or argon, and for a period of five minutes to five hours.

The molded product is then dried in a conventional manner. The size of the molded product is not critical but may conveniently be at least 0.5 mm in diameter or length. The additive of the present invention may be incorporated in a molten metal as it is. If desired, the additive may be incorporated after it is crushed into a suitable smaller size.

The respective ingredients of the additive prepared by the process of the present invention are present in a finely divided form. Accordingly, when the additive is incorporated in a molten metal, fine magnesium foams are produced therein and the desired reaction proceeds with an enhanced reaction efficiency. Furthermore, it is to be noted that the finely divided reaction product obtained by the process of the present invention generally has a structure such that the metallic magnesium ingredient is at least partially covered with the magnesium oxide ingredient which desirably controls the rate of reaction. Thus, when the additive is incorporated in a molten metal, the magnesium oxide ingredient functions as a diluent for the magnesium ingredient, and thus, prevents or minimizes the undesirable vaporization of magnesium and moderates the rapid reaction. This is in contrast to a conventional metallic magnesium additive, which causes a radical reaction and exhibits a low reaction efficiency.

As the additive of the present invention contains, in addition to the metallic magnesium and magnesium oxide ingredients, calcium carbide and calcium oxide, the additive can be used, for example, as a desulfurizer for a molten pig iron, as an inoculant for spheroidal graphite cast-iron and as a dephosphorizer for various metals.

The invention is further illustrated with reference to the examples set forth below, in which % is by weight unless otherwise specified.

In the examples desulfurization percentage (D-S. P), desulfurization efficiency (D-S. E.), dephosphorization percentage (D-P. P.) and dephosphorization efficiency (D-P. E.) refer to those which are defined by the following equations.

Desulfurization percentage = $[(A−B)/A] \times 100$ where A is a content of sulfur in a pig iron as measured before desulfurization and B is a content of sulfur in the pig iron as measured after desulfurization.

Desulfurization efficiency = $(C/D) \times 100$ where C is the amount of the metallic magnesium and calcium carbide ingredients in the additive, which ingredients have been consumed for the reaction with sulfur contained in a pig iron and D is the amount of the metallic magnesium and calcium carbide ingredient in the additive incorporated in the pig iron.

Dephosphorization percentage = $[(A'−B')/A'] \times 100$ where A' is the content of phosphorus in a metal as measured before dephosphorization and B' is the content of phosphorus in a metal as measured after dephosphorization.

Dephosphorization efficiency = $(C'/D') \times 100$ where C' is the amount of calcium carbide in the additive, which calcium carbide has been consumed for the production of calcium phosphide, and D' is the amount of calcium carbide in the additive incorporated in a molten metal.

EXAMPLE 1

A metal-refining additive was prepared by using an apparatus similar to that illustrated in FIG. 1.

Calcined dolomite comprised of, based on the weight of the calcined dolomite, 30.36% of MgO, 66.96% of Cao, 0.06% of $Fe_2O_3$, 0.09% of $Al_2O_3$, 0.48% of $SiO_2$ and 1.30% of ignition loss was blended with a finely divided petroleum coke having an average particle size of smaller than 325 mesh. The proportion of the dolomite to the petroleum coke was stoichiometric according to the reaction formula (1), hereinbefore mentioned. This raw material blend was granulated into a particle size of approximately 0.1 millimeter. The granular raw material blend was introduced at a rate of one gram/minute through a reaction furnace provided with a three-phase direct current arc plasma generator. The reaction furnace had a reaction chamber of approximately 300 milliliters in volume having an artificial graphite inner lining. The arc plasma generator was arranged so that large plasma flames were formed in the reaction chamber. Thus, the granular raw material was exposed to plasma flames having a temperature of aporoximately 1,900° C. (The temperature was measured at the center of the junction portion of the plasma flames). The residence time of the raw material in the plasma flames was approximately 1/100 seconds. The reaction product was suddenly cooled in a cooling chamber of approximately 1,200 milliliters in volume by blowing thereagainst a nitrogen gas having a temperature of 30° C., at a rate of 35 N liters/minute, whereby the temperature of the reaction product was lowered to below 170° C. in approximately 1/100 second. The reaction product in the form of dust was collected in a cyclone disposed underneath the reaction furnace and in a bag filter connected to the cyclone. The collected dust was directly introduced into a kneader where the dust was mixed with 50%, based on the weight of the dust, of a 5% polyacrylate resin binder solution in toluene. The kneaded product was formed, by using a granulator, into granules having a particle size of one millimeter.

The dust collected in the cyclone and the bag filter proved to have the composition shown in Table I, below.

Table I

| Dust | Composition of Dust (% by weight) | | | | | |
|---|---|---|---|---|---|---|
| | T.*¹Mg | T.Ca | T.C | N | Free C | Met.*²Mg |
| Bag filter | 70 | 9.1 | 9.4 | 4.7 | (4.1) | (50.6) |
| Cyclone | 12.3 | 56.4 | 18.3 | 0.8 | — | (8.4) |

*1 T. refers to the total amount of the combined ingredient and the free ingredient.
*2 Met. refers to metallic.

The granule prepared from the dust and the polyacrylate resin binder proved to have the composition shown in Table II, below.

Table II

| Composition of Granules (% by weight) | | | | | |
|---|---|---|---|---|---|
| $CaC_2$ | CaO | Mg | MgO | Free C | N |
| 37.5 | 32.8 | 14.5 | 4.8 | 1.4 | 1.4 |

Figure 2:
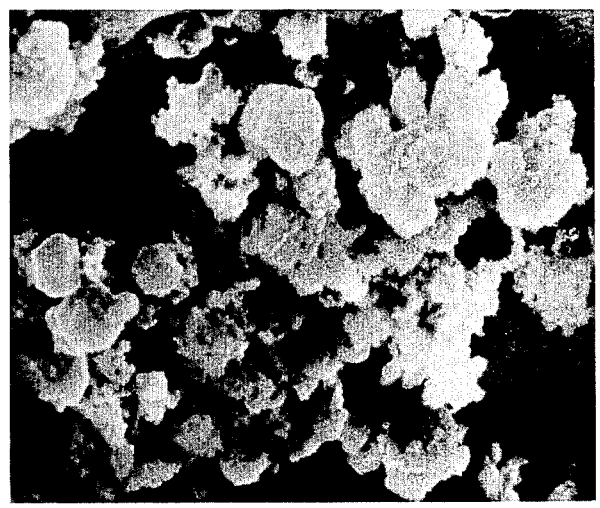
FIG. 2 is an electron microscopic photograph (5,000×) of a product prepared by the process of the present invention, which product is in the form of a dust as it is collected in a bag filter and a cyclone.
Figure 3:
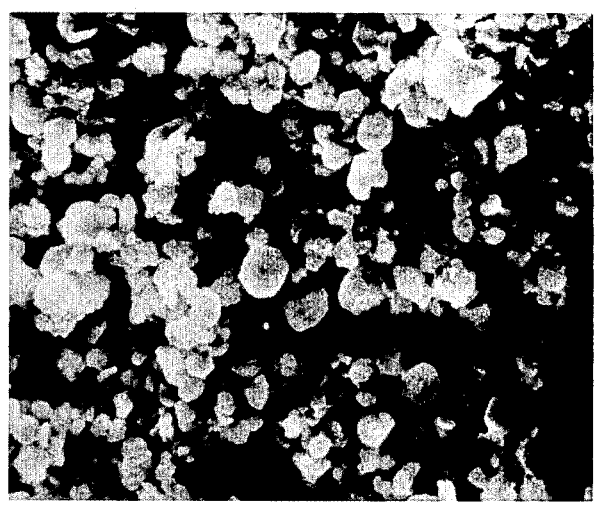
FIG. 3 is an electron microscopic photograph (3,000×) of a mixture comprised of the dust shown in FIG. 2 and a finely divided acrylic resin.

An electron microscopic photograph (5,000×) of the dust collected in the cyclone and the bag filter, and an electron microscopic photograph (3,000×) of the granule prepared from the dust and the polymer binder are shown in FIGS. 2 and 3, respectively. These photographs show that the reaction product prepared by the process of the invention consists of fine particles of a substanitally uniform size.

Using the above-mentioned granules, a desulfurization test was carried out on pig iron as follows. The apparatus used for the desulfurization test was provided with a magnesia crucible and a plunger type desulfurizer supplier. The granules in the amount shown in Table III below were incorporated in 2 kilograms of pig iron, maintained at a temperature of 1,450° C., and containing 4% of carbon, 2% of silicon and 0.026% of sulfur, in a nitrogen atmosphere.

For comparison purposes, desulfurization tests were carried out in a similar manner, wherein a conventional calcium carbide desulfurizer having a purity of 80% and a conventional mangesium desulfurizer having a purity of 99.5% were separately used. These two desulfurizers were used in the form of granule having a particle size of 1 millimeter.

Test results are shown in Table III below.

Table III

| Desulfurizer | Amount of desulfurizer incorporated (g per kg of pig iron) | Content of Sulfur in Pig Iron (%) Before desulfurization | Content of Sulfur in Pig Iron (%) After desulfurization | D-S.P. (%) | D-S.E. (%) |
|---|---|---|---|---|---|
| Invention (Example 1) | 1.0 | 0.024 | 0.008 | 67 | 42 |
| Comparative $CaC_2$ | 2.1 | 0.026 | 0.015 | 42 | 13 |
| Comparative Mg | 0.6 | 0.025 | 0.012 | 52 | 16 |

D-S.P. = Desulfurization percentage
D-S.E. = Desulfurization efficiency

EXAMPLE 2

Using the granules prepared from the reaction product dust and the polymer binder in Example 1, dephosphorization tests were carried out on ferrochrome as follows. The ferrochrome consisted of 65% of chrominum, 3% of carbon, 0.03% of phosphorus and the balance of iron. The granules, in the amount shown in Table IV below, filled in a mild steel tube, were placed and stirred in 2 kilograms of the molten ferrochrome, maintained at a temperature of 1,600° C., placed in a magnesia crucible in an argon atmosphere, having one atmosphere of pressure.

For comparison purposes, a dephosphorization test was carried out in a similar manner, wherein a conventional calcium carbide additive similar to that used in Example 1 was used.

Test results are shown in Table IV below.

Table IV

| dephosphorizer | Amount of dephosphorizer incorporated (g per kg of pig iron) | Content of P in Ferrochrome (%) Before dephosphorization | Content of P in Ferrochrome (%) After dephosphorization | D-P.P. (%) | D-P.E. (%) |
|---|---|---|---|---|---|
| Invention (Example 2) | 9 | 0.032 | 0.006 | 81 | 24 |
| Comparative $CaC_2$ | 6 | 0.031 | 0.013 | 58 | 12 |

D-P.P. = Dephosphorization percentage
D-P.E. = Dephosphorization efficiency

EXAMPLE 3

Following a procedure similar to that mentioned in Example 1, a metal-refining additive was prepared from synthetic dolomite and petroleum coke. The synthetic dolomite was comprised of 64.2% of MgO, 34.05% of CaO, 0.06% of $Fe_2O_3$, 0.03% of $Al_2O_3$, 0.3% of $SiO_2$ and 1.35% of ignition loss. The dolomite and petroleum coke were blended together, and then, kneaded with 20%, based on the weight of the dolomite-petroleum coke blend, of an aqueous 0,.3% polyvinyl alcohol solution. The kneaded product was granulated into granules having a particle size of 0.1 millimeter, and then, dried at a temperature of 200° C. The granules so prepared were exposed to plasma in a manner similar to that mentioned in Example 1, wherein the granules were supplied to the reaction furnace at a rate of 0.5 gram/minute.

The reaction product in the form of dust, which was collected in the cyclone and the bag filter, proved to have the composition shown in Table V, below.

Table V

| Dust | Composition of Dust (% by weight) | | | | | |
|---|---|---|---|---|---|---|
| | T.Mg | T.Ca | T.C | N | Free C | Met.Mg |
| Bag filter | 81.5 | 3.5 | 8.0 | 4.0 | (4.5) | (64.0) |
| Cyclone | 31.1 | 39.7 | 19.0 | 0.5 | — | ( 6.6) |

A metal-refining additive in the form of granules having a particle size of one millimeter was prepared from the collected dust in a manner similar to that mentioned in Example 1, wherein 50%, based on the weight of the collected dust, of a 3% polystyrene binder solution in toluene was used.

The granular additive so prepared proved to have the composition shown in Table VI, below.

Table VI

| Composition of Additive (% by weight) | | | | | |
|---|---|---|---|---|---|
| Mg | MgO | $CaC_2$ | CaO | Free | N |
| 27.2 | 20.2 | 21.7 | 19.4 | 1.9 | 1.6 |

Using the above-mentioned additive, a desulfurization test was carried out on pig iron containing 3.5% of carbon, 1.0% of silicon and 0.03% of sulfur. The additive was incorporated, by using an injection type supplier, in 2 kilograms of the pig iron, maintained at a temperature of 1,430° C., and placed in an alumina crucible.

For comparison purposes a desulfurization test was similarly carried out, wherein a conventional calcium carbide additive similar to that used in Example 1 was used.

Test results are shown in Table VII below.

Table VII

| Desulfurizer | Amounts of desulfurizer incorporated (g per kg of pig iron) | Content of Sulfur in Pig Iron (%) Before desulfurization | Content of Sulfur in Pig Iron (%) After desulfurization | D-S.P. (%) | D-S.E. (%) |
|---|---|---|---|---|---|
| Invention (Example 3) | 1.0 | 0.031 | 0.005 | 84 | 55 |
| Comparative $CaC_2$ | 2.0 | 0.029 | 0.010 | 66 | 24 |

What we claim is:

1. A process for preparing an additive for use in metal-refining, which comprises the steps of:
   maintaining, at a temperature of from 1,600° C. to 4,000° C., and mixture comprised of (a) at least one magnesium compound selected from the group consisting of magnesium carbonate and magnesium oxide, and (b) at least one calcium compound selected from the group consisting of calcium carbonate and calcium oxide in the presence of a carbonaceous material, in a non-oxidizing atmosphere, for a time sufficient to form a mixture containing metallic magnesium, magnesium oxide, calcium carbide and calcium oxide and then;

suddenly cooling the reaction product so obtained sufficiently rapidly to prevent conversion of all the calcium carbide to calcium oxide and carbon.

2. A process according to claim 1 wherein said reaction product is cooled to a temperature of lower than 500° C. within a period of from 1/5,000 to 1/100 second.

3. A process according to claim 1 or 2 wherein said sudden cooling of said reaction product is effected by blowing a non-oxidizing gas having a temperature of lower than 400° C. against the reaction product in the form of dust.

4. A process according to claim 1 wherein the proportion of the magnesium compound to the calcium compound is within the range of from 10:90 to 97:3 by weight.

5. A process according to claim 1 wherein said composition is dolomite.

6. An additive for use in metal-refining which comprises 5 to 55% by weight of metallic magnesium, 3 to 40% by weight of magnesium oxide, 1 to 50% by weight of calcium carbide and 3 to 70% by weight of calcium oxide, and which is prepared by the steps of:

maintaining, at a temperature of from 1,600° C. to 4,000° C., a composition comprised of (a) at least one magnesium compound selected from the group consisting of magnesium carbonate and magnesium oxide, and (b) at least one calcium compound selected from the group consisting of calcium carbonate and calcium oxide in the presence of a carnonaceous material, in a non-oxidizing atmosphere for a time sufficient to form a mixture containing metallic magnesium, magnesium oxide, calcium carbide and calcium oxide, and then;

suddenly cooling the reaction product so obtained sufficiently rapidly to prevent conversion of all the calcium carbide to calcium oxide and carbon.

7. A process according to claim 1 wherein the conditions are such as to provide a product comprising 5 to 55% by weight of metallic magnesium, 3 to 40% by weight of magnesium oxide, 1 to 50% by weight of calcium carbide and 3 to 70% by weight of calcium oxide.

* * * * *